(12) United States Patent
Vichev et al.

(10) Patent No.: US 10,926,203 B2
(45) Date of Patent: Feb. 23, 2021

(54) FLUID FILTER ELEMENT FOR CIRCULAR LOCKING ENGAGEMENT WITH A FILTER SUPPORT

(71) Applicant: A.L. FILTER CO., LTD., Ashdod (IL)

(72) Inventors: Veselin Stefanov Vichev, Ruse (BG); Georgi Krastev Petrov, Ruse (BG)

(73) Assignee: A.L. FILTER CO., LTD., Ashdod (IL)

( * ) Notice: Subject to any disclaimer, the term of this patent is extended or adjusted under 35 U.S.C. 154(b) by 133 days.

(21) Appl. No.: 16/216,238

(22) Filed: Dec. 11, 2018

(65) Prior Publication Data

US 2020/0179840 A1 Jun. 11, 2020

(51) Int. Cl.
*B01D 29/96* (2006.01)
*B01D 29/13* (2006.01)

(52) U.S. Cl.
CPC ............. *B01D 29/96* (2013.01); *B01D 29/13* (2013.01); *B01D 2201/291* (2013.01); *B01D 2201/305* (2013.01); *B01D 2201/4023* (2013.01)

(58) Field of Classification Search
None
See application file for complete search history.

(56) References Cited

U.S. PATENT DOCUMENTS

| 10,525,245 B2 * | 1/2020 | Smith .................. H04N 5/2254 |
| 2014/0263099 A1 | 9/2014 | Patera et al. |
| 2020/0179840 A1 * | 6/2020 | Vichev .................. B01D 29/96 |

FOREIGN PATENT DOCUMENTS

| CN | 204458138 U | * | 7/2015 |
| EP | 2 181 750 A1 | | 5/2010 |
| EP | 2 789 375 A1 | | 10/2014 |

OTHER PUBLICATIONS

European Search Report dated Oct. 31, 2019, which issued during the prosecution of Applicant's European App No. 19171144.9.

* cited by examiner

*Primary Examiner* — Chester T Barry
(74) *Attorney, Agent, or Firm* — Sughrue Mion, PLLC

(57) ABSTRACT

A fluid filter element for circular locking engagement with a filter support, the fluid filter element including a filter medium arranged about a longitudinal axis, first and second end caps arranged at opposite cylindrical ends of the filter medium and sealed thereto, at least one locking protrusion located on the second end cap for rotatably locking the fluid filter to the filter support and at least one releasable retainer located on the second end cap and associated with at the at least one locking protrusion for retaining the at least one locking protrusion in locking engagement with the filter support and being operative, when released, to allow rotatable unlocking of the fluid filter element.

4 Claims, 16 Drawing Sheets

FLUID FILTER ELEMENT FOR CIRCULAR LOCKING ENGAGEMENT WITH A FILTER SUPPORT

SUMMARY OF THE INVENTION

The present invention seeks to provide an improved fluid filter.

There is thus provided in accordance with a preferred embodiment of the present invention a fluid filter element for circular securable locking engagement with a filter support, the fluid filter element including a filter medium arranged in a cylindrical arrangement about a longitudinal axis, first and second end caps arranged at opposite cylindrical ends of the filter medium and sealed thereto, the second end cap defining a filtered fluid outlet, at least one locking protrusion located on the second end cap for rotatably locking the fluid filter to the filter support by rotation of the fluid filter element about the longitudinal axis in a first direction of rotation relative to the filter support and at least one releasable retainer located on the second end cap and associated with at the at least one locking protrusion for retaining the at least one locking protrusion in locking engagement with the filter support and being operative, when released, to allow rotatable unlocking of the fluid filter element from the filter support by rotation of the fluid filter element about the longitudinal axis in a second direction of rotation relative to the filter support, opposite to the first direction of rotation.

There is also provided in accordance with another preferred embodiment of the present invention a fluid filter system including a filter support and a fluid filter element for circular securable locking engagement with the filter support, the fluid filter element including a filter medium arranged in a cylindrical arrangement about a longitudinal axis, first and second end caps arranged at opposite cylindrical ends of the filter medium and sealed thereto, the second end cap defining a filtered fluid outlet, at least one locking protrusion located on the second end cap for rotatably locking the fluid filter to the filter support by rotation of the fluid filter element about the longitudinal axis in a first direction of rotation relative to the filter support and at least one releasable retainer located on the second end cap and associated with at the at least one locking protrusion for retaining the at least one locking protrusion in locking engagement with the filter support and being operative, when released, to allow rotatable unlocking of the fluid filter element from the filter support by rotation of the fluid filter element about the longitudinal axis in a second direction of rotation relative to the filter support, opposite to the first direction of rotation.

Preferably, the at least one releasable retainer is configured for actuation in a direction generally parallel to the longitudinal axis to provide release, thereby to allow rotatable unlocking of the fluid filter element from the filter support.

In accordance with a preferred embodiment of the present invention the at least one locking protrusion is entirely integrally formed with the second end cap.

In accordance with a preferred embodiment of the present invention, the at least one releasable retainer is co-molded with the second end cap.

Preferably, the at least one releasable retainer is partially integrally formed with the second end cap. Alternatively, the at least one releasable retainer is entirely integrally formed with the second end cap.

BRIEF DESCRIPTION OF THE DRAWINGS

The present invention will be understood and appreciated more fully from the following detailed description, taken in conjunction with the drawings which follow.

DETAILED DESCRIPTION OF PREFERRED EMBODIMENTS

Figure 1:
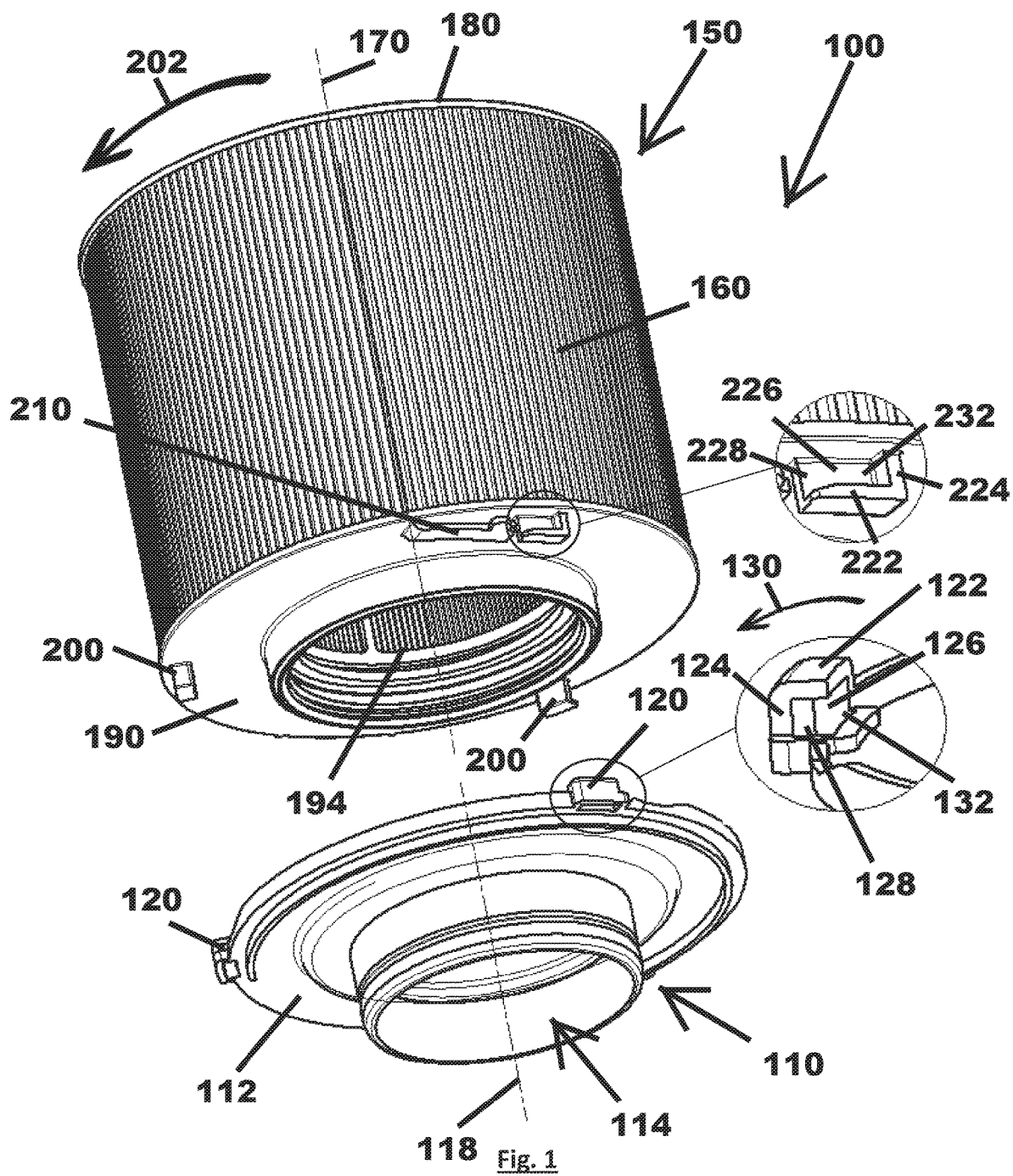
FIG. 1 is a simplified pictorial illustration of a filter system constructed and operative in accordance with one embodiment of the present invention.
Figure 2A:
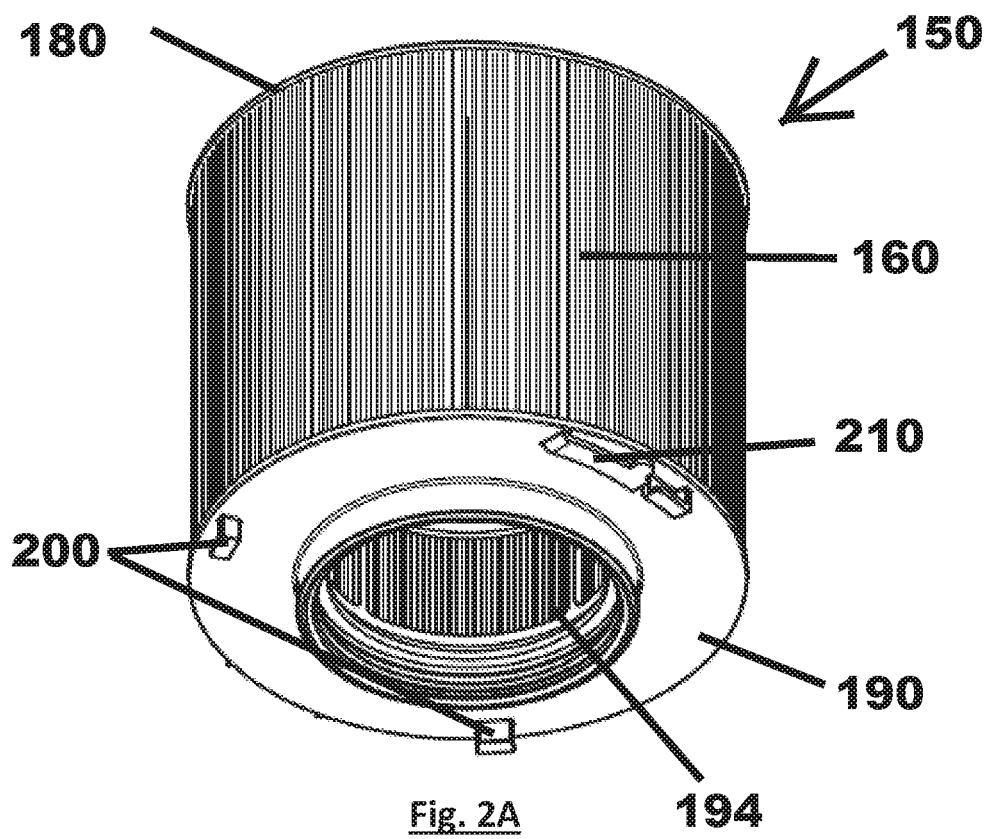
FIGS. 2A, 2B and 2C are simplified respective pictorial, planar bottom view and planar side view illustrations of a filter element forming part of the filter system of FIG. 1.
Figure 2B:
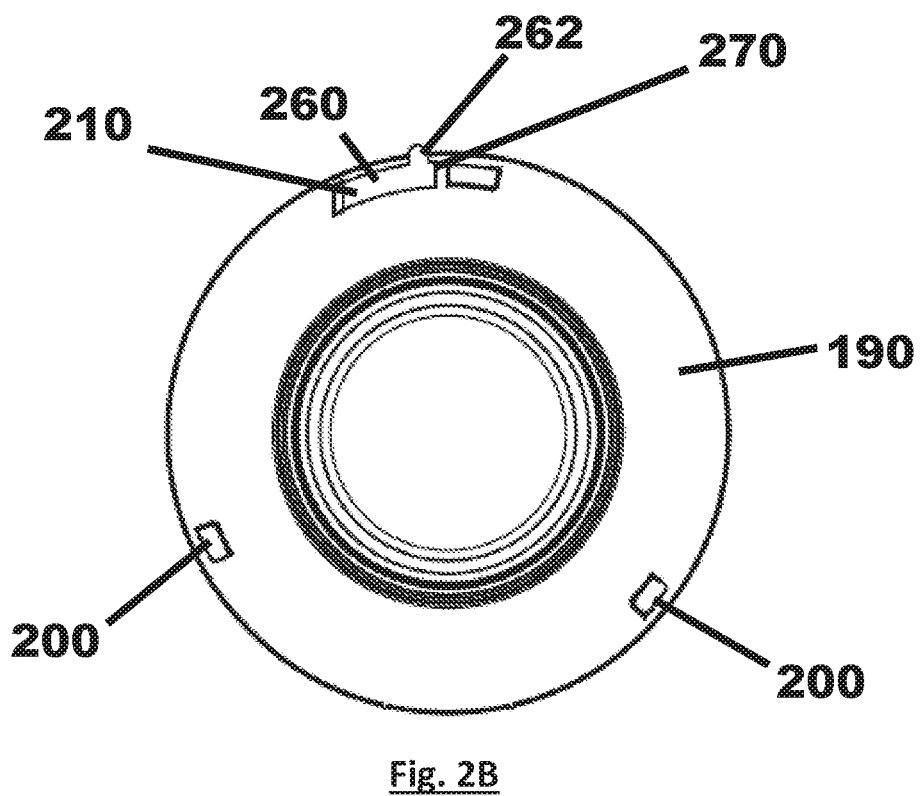
Figure 2C:
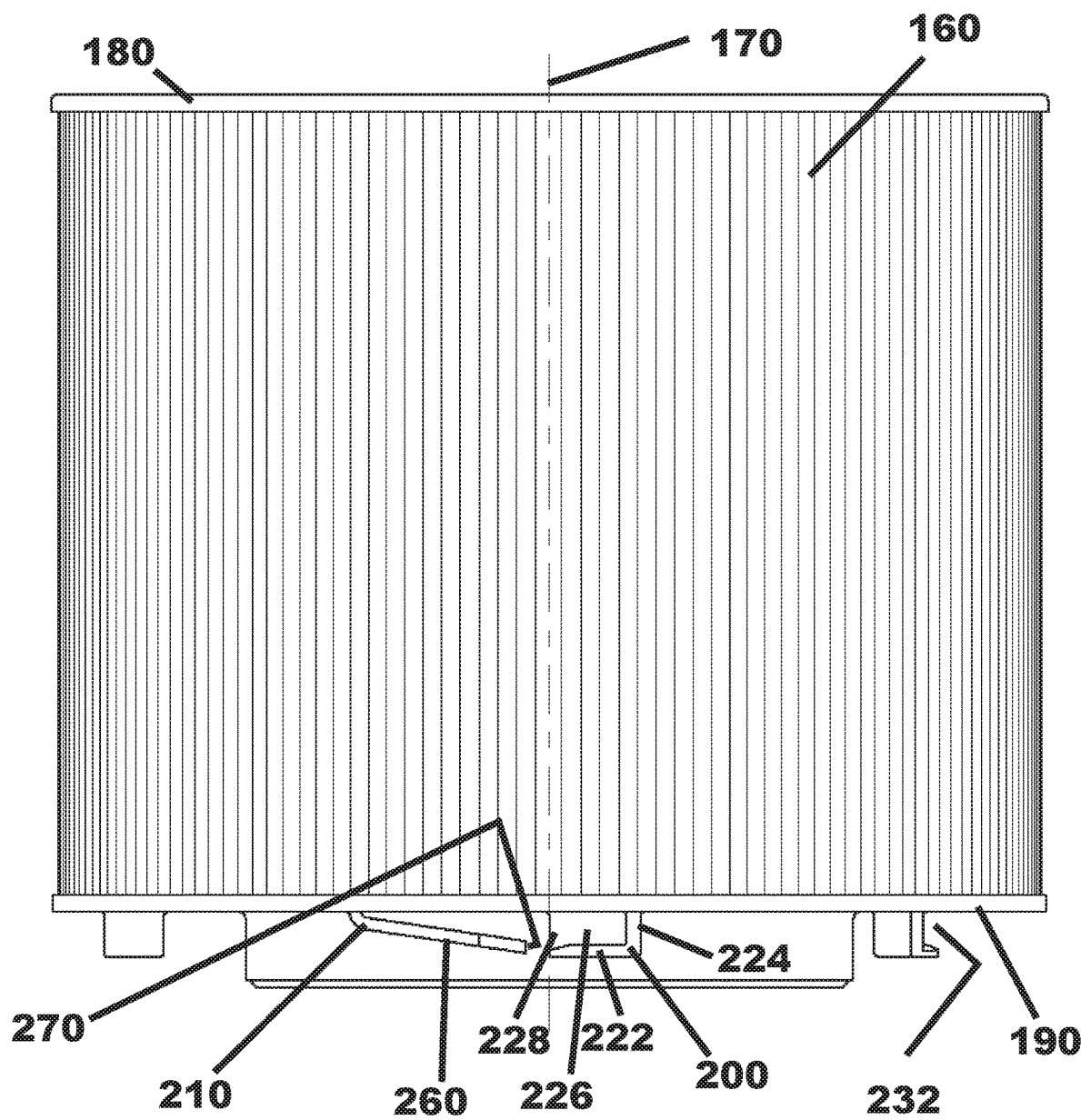
Figure 3:
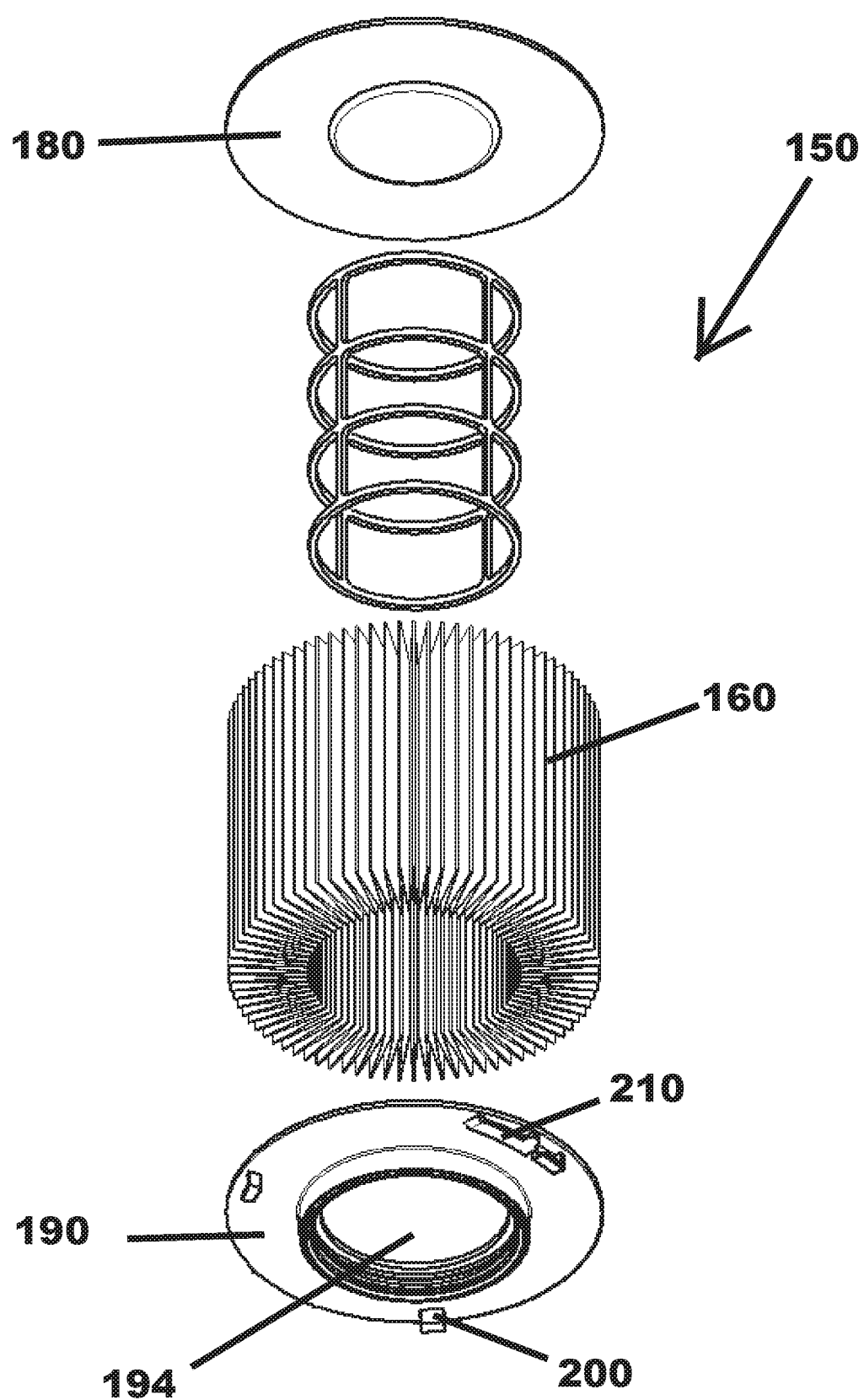
FIG. 3 is a simplified exploded view illustration of the filter element of FIGS. 2A-2C.

Reference is now made to FIGS. 1-4F, which illustrate a filter system constructed and operative in accordance with one embodiment of the present invention.

As seen in FIGS. 1-4F, there is provided a filter system 100 comprising a filter support 110, which typically forms part of a filter housing of an engine or a vehicle. Filter support 110 preferably includes a filter support plate 112, which is formed with a clean air passage aperture 114, which is centered about a longitudinal axis 118. Preferably filter support plate 112 is formed with a plurality of filter element engagement protrusions 120, which are evenly azimuthally distributed about longitudinal axis 118.

As see in FIG. 1, filter element engagement protrusions 120 preferably each include a top wall portion 122, extending generally perpendicular to longitudinal axis 118 and an end wall portion 124 joining top wall portion 122 and defining therewith a channel 126 having an open end 128, typically facing in a counter-clockwise direction, indicated by an arrow 130, in the downward-facing sense of FIG. 1, and an open radially inward facing side opening 132.

In accordance with a preferred embodiment of the present invention, as illustrated in FIGS. 1-4F, filter system 100 comprises a filter element 150 which includes a filter medium 160, arranged in a cylindrical arrangement about a longitudinal axis 170, which when filter element 150 is mounted onto filter support 110, is coaxial with longitudinal axis 118. First and second end caps 180 and 190 are arranged at opposite cylindrical ends of the filter medium 160 and sealed thereto.

Fluid, such as air, to be filtered enters the filter element 150 via the filter medium 160 and is filtered thereby and the filtered fluid leaves the filter element 150 via a filtered fluid outlet 194 formed in second end cap 190.

It is a particular feature of a preferred embodiment of the present invention that at least one locking protrusion 200 is located on second end cap 190 for rotatably locking the fluid filter element 150 to filter support 100 by engagement of locking protrusions 200 with corresponding filter element engagement protrusions 120 of filter support 110 by means of rotation of the fluid filter element 150 about mutually coaxial longitudinal axes 118 and 170 in a first direction of rotation, here shown as counterclockwise, in the sense of FIG. 1, and indicated by an arrow 202.

It is a further particular feature of a preferred embodiment of the present invention that at least one releasable retainer 210 is located on second end cap 190 and associated with one or more locking protrusion 200 for retaining locking protrusion 200 in locking engagement with filter support 110. Releasable retainer 210, only one of which is shown in FIGS. 1-4F, is operative, when released, to allow rotatable unlocking of filter element 150 from filter support 110 by rotation of the filter element about coaxial longitudinal axes 118 and 170 is in a second direction of rotation, opposite to the first direction. The second direction of rotation is indicated by an arrow 214.

In the embodiment of FIGS. 1-4F, the locking protrusion 200 preferably extends downwardly from second end cap 190. Protrusion 200 preferably includes a bottom wall portion 222, extending generally perpendicular to longitudinal axis 170 and an end wall portion 224 joining bottom wall portion 222 and defining therewith a channel 226 having an open end 228, typically facing in a clockwise direction, in the sense of FIG. 1, indicated by an arrow 202, and an open radially outward facing side opening 232.

Figure 4A:
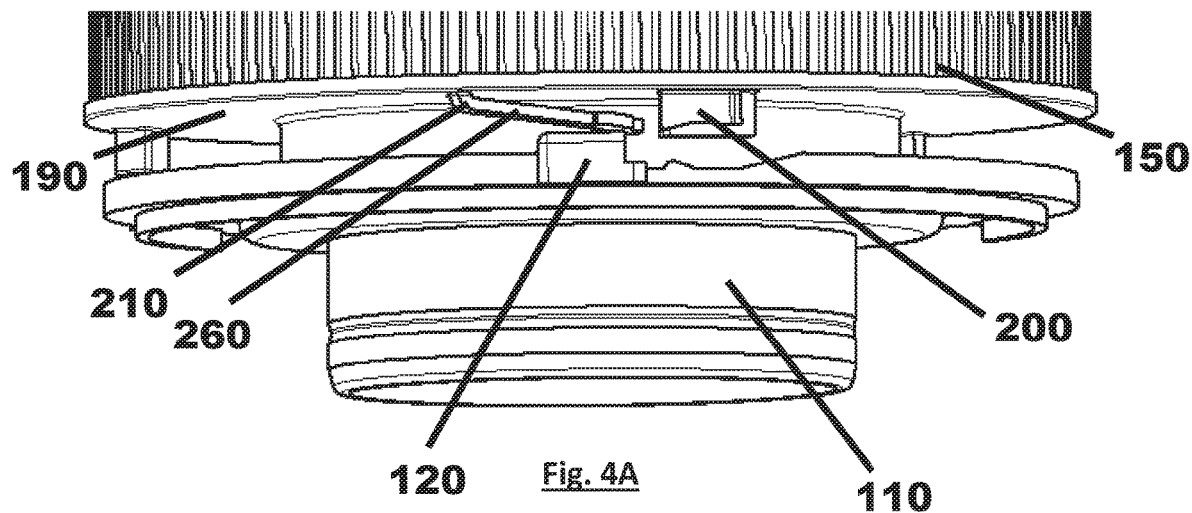
FIGS. 4A, 4B, 4C, 4D, 4E and 4F are simplified illustrations of locking and unlocking engagement of the filter element of FIGS. 2A-3 with the filter support of FIG. 1.
Figure 4B:
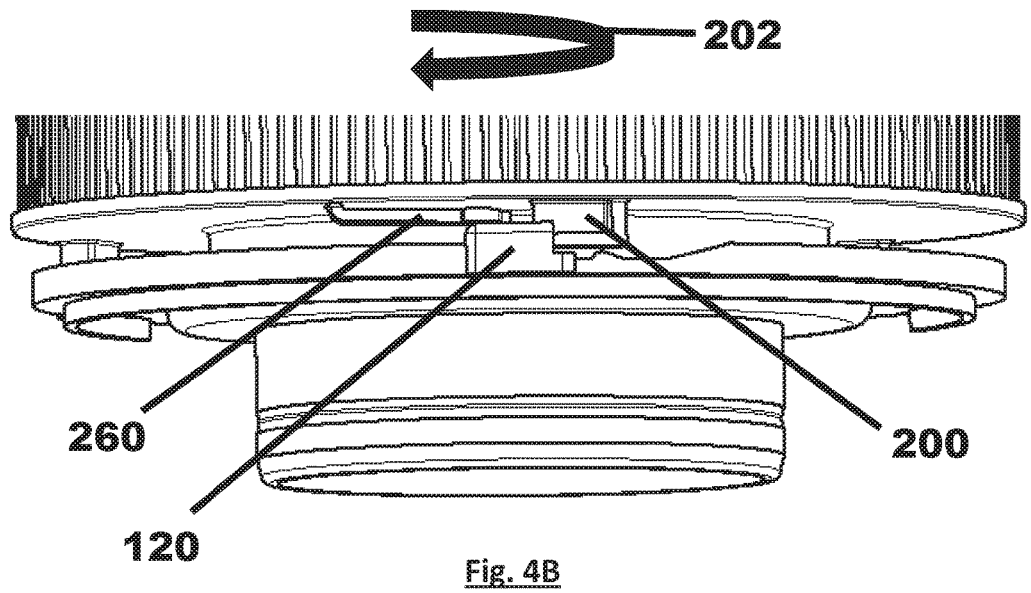
Figure 4C:
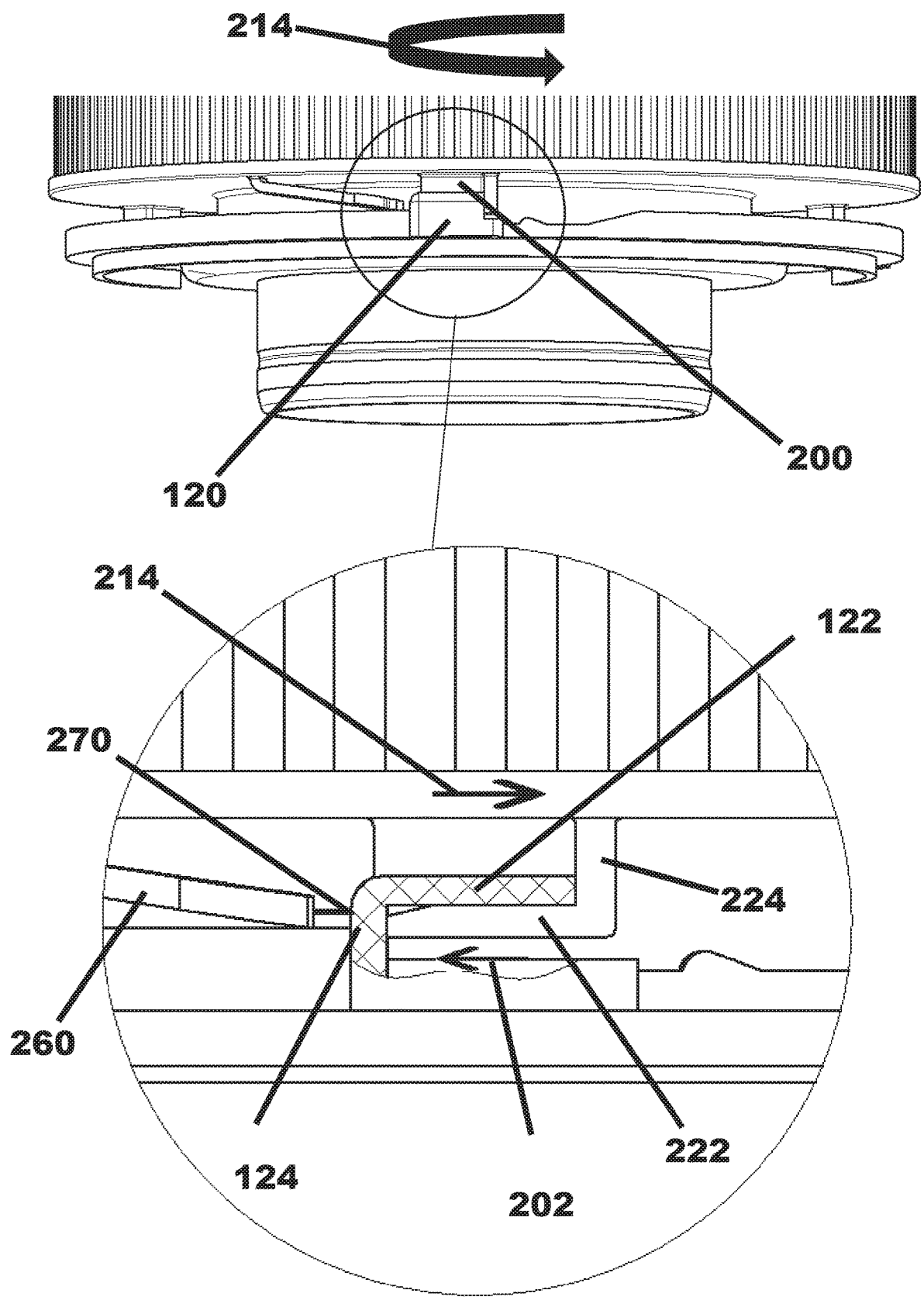

Protrusion 200 is configured for rotatable engagement and disengagement with a corresponding protrusion 120 of filter support 110, whereby rotatable engagement is produced by rotation of filter element 150 from an operative orientation shown in FIG. 4A, about coaxial axes 118 and 170 such that bottom wall portion 222 slidingly moves rotationally through open side opening 132 of protrusion 120, as seen in FIG. 4B, in a direction indicated by arrow 202, until end wall portion 224 of protrusion 200 abuts against top wall portion 122 of protrusion 120 and bottom wall portion 222 of protrusion 200 abuts against end wall portion 124 of protrusion 120, as seen in FIG. 4C.

At least partially integrally formed with second end cap 190 is at least one releasable retainer 210 associated with at least one locking protrusion 200 for retaining the at least one locking protrusion 200 in locking engagement with a corresponding engagement protrusion 120 of the filter support 110. In the illustrated embodiment a single releasable retainer 210 is provided. Releasable retainer 210 is operative when the filter element is in its operative orientation vis a vis the filter support 110 shown in FIG. 4C to prevent rotation of the filter element 150 relative to the filter support 110 about coaxial longitudinal axes 118 and 170 in a direction indicated by arrow 214 in FIG. 4C. When retainer 210 is displaced, typically by manual action, it is operative to allow rotatable unlocking of the fluid filter element 150 from the filter support 110 by rotation of the fluid filter element 150 in the direction indicated by arrow 214.

In the embodiment of FIGS. 1-4F, the releasable retainer 210 comprises a resilient securing finger 260 which is preferably integrally formed with second end cap 190 and which is normally in a raised operative orientation, as seen in FIGS. 1A-3 and 4A. Resilient securing finger 260 preferably includes a radially outwardly extending user engageable tab portion 262, which extends beyond the circumference of second end cap 190. As seen in FIG. 4B, initial rotational engagement between protrusions 120 and 200 causes securing finger 260 to be pressed as protrusion 120 passes thereover into full rotational engagement with protrusion 200. Upon full rotational engagement with protrusion 200, protrusion 120 clears resilient securing finger 260 and allows it to reassume its raised operative orientation, as seen in FIG. 4C.

It is appreciated that when resilient securing finger 260 is in its raised operative orientation and protrusions 120 and 200 are in full rotational engagement, as seen in FIG. 4C, a forward edge 270 of resilient securing finger 260 engages a corresponding facing edge of protrusion 120 and prevents rotational movement of protrusion 200 relative to protrusion 120 in a direction indicated by arrow 214, and thus prevents mutual disengagement of protrusions 120 and 200, thereby preventing disengagement of filter element 150 from filter support 110.

Figure 4D:
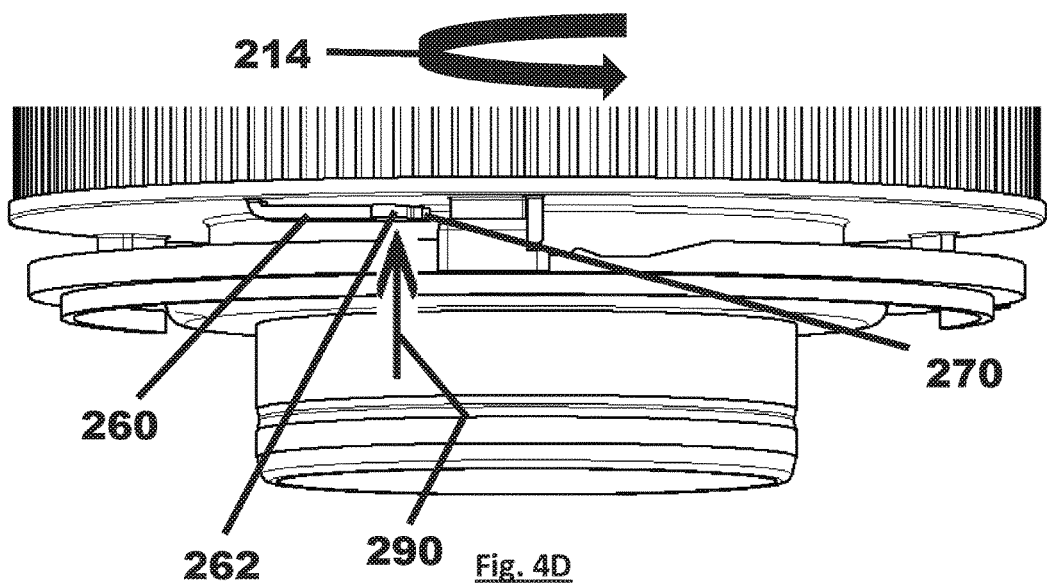
Figure 4E:
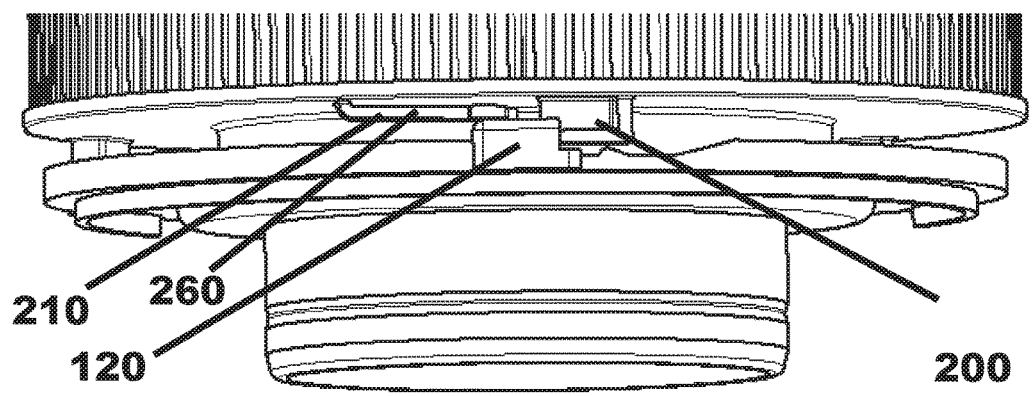
Figure 4F:
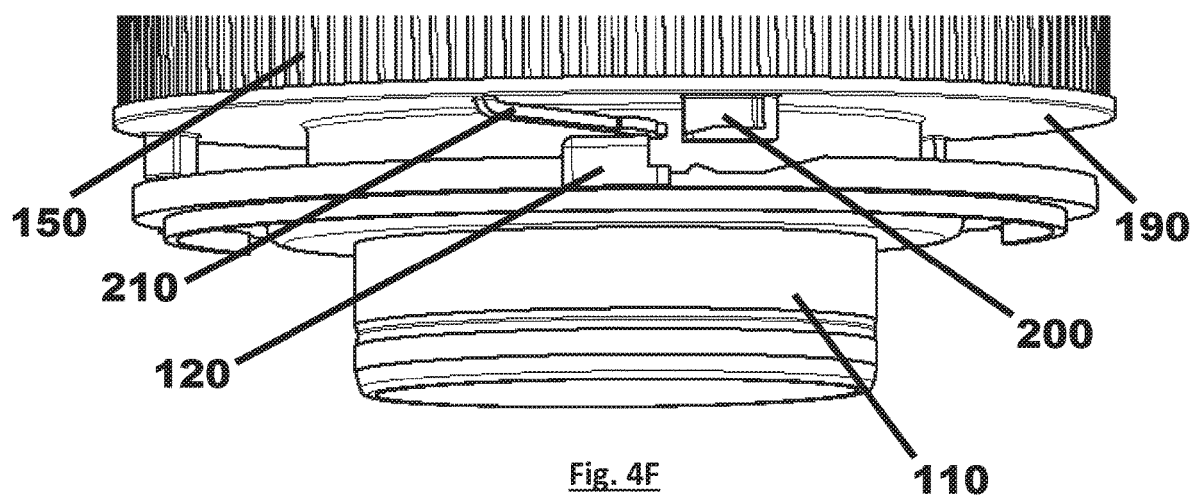

Turning to FIG. 4D, it is seen that depressing resilient securing finger 260, as by manual engagement with tab portion 262 thereof, in a direction indicated by an arrow 290, enables protrusion 120 to clear forward edge 270 of finger 260 and thus enables the filter element 150 to be rotated in direction indicated by arrow 214 and over finger 260, as seen in FIG. 4E and onward to a fully disengaged mutual orientation as seen in FIG. 4F.

Rotatable disengagement is produced by rotation of filter element 150 about coaxial axes 118 and 170 such that bottom wall portion 222 slidingly moves rotationally through open side opening 132 of protrusion 120 away from end wall portion 124 of protrusion 120 until protrusions 200 and 120 are no longer in engagement.

Figure 5:
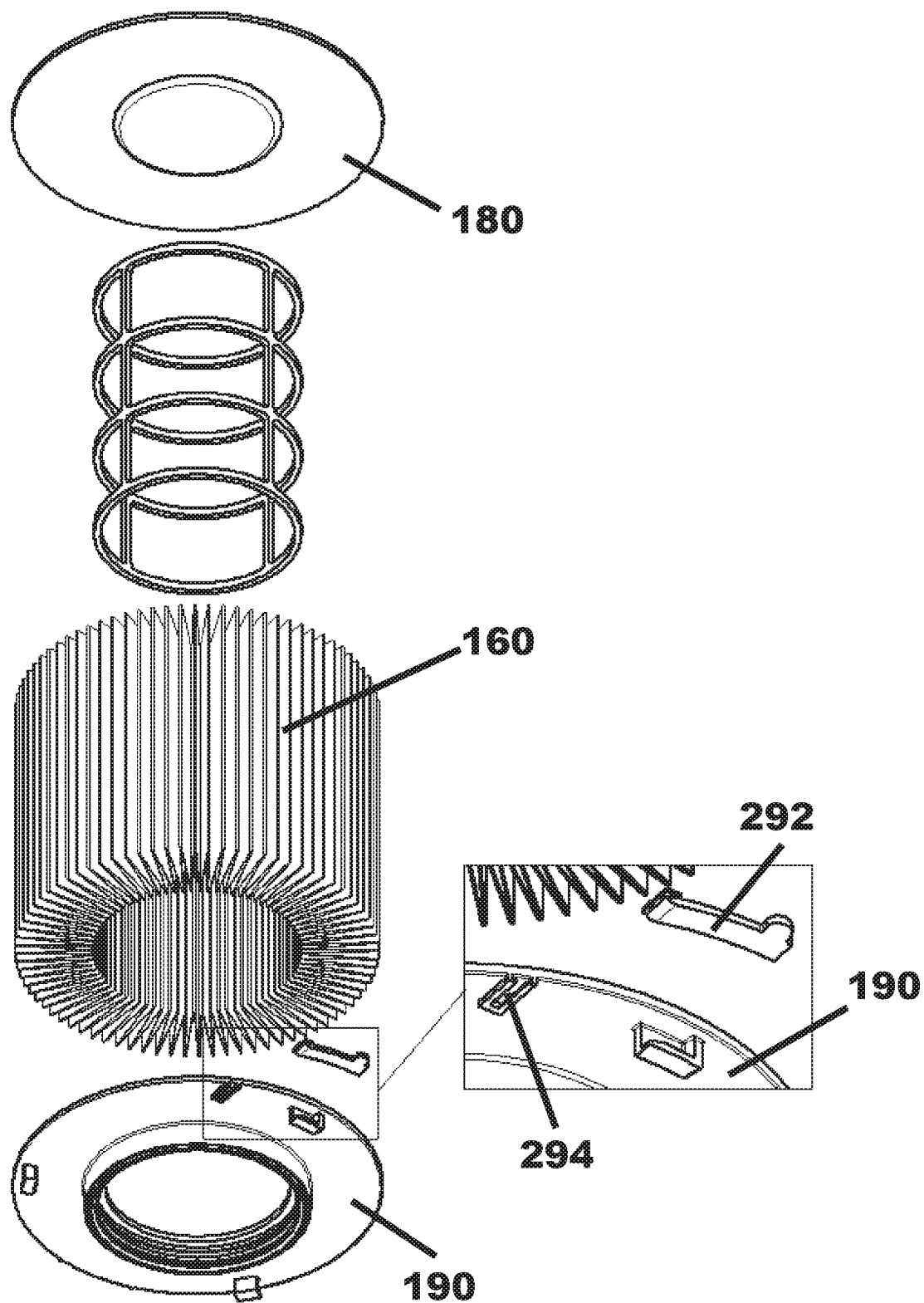
FIG. 5 is a simplified exploded view illustration of an alternative embodiment of the filter element of FIGS. 2A-2C.

Referring now to FIG. 5, it is seen that in an alternative embodiment of the present invention, a resilient securing finger 292 may be snap fit mounted onto a mounting socket 294 formed on second end cap 190, rather than being integrally formed therewith. The functionality of resilient securing finger 292 may be identical to that of resilient securing finger 260. Alternatively, the socket 294 may be obviated and the finger 292 may be mounted directly onto the second end cap 190.

Reference is now made to FIGS. 6-9F, which illustrate a filter system constructed and operative in accordance with one embodiment of the present invention.

As seen in FIGS. 6-9F, there is provided a filter system 300 comprising a filter support 310, which typically forms part of a filter housing of an engine or a vehicle. Filter support 310 preferably includes a filter support plate 312, which is formed with a clean air passage aperture 314, which is centered about a longitudinal axis 318. Preferably filter support plate 312 is formed with a plurality of filter element engagement protrusions 320, which are evenly azimuthally distributed about longitudinal axis 318.

Figure 6:
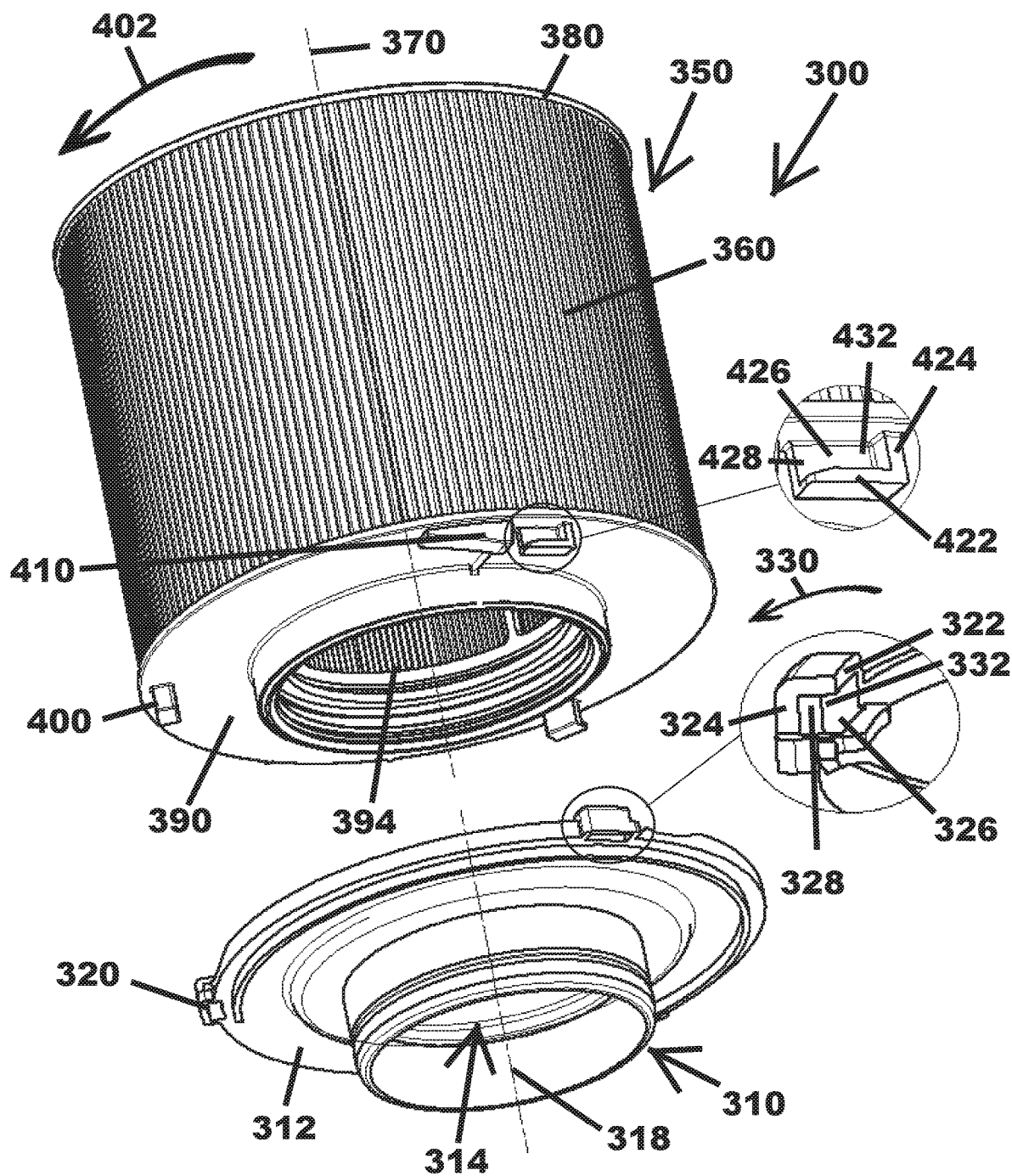
FIG. 6 is a simplified pictorial illustration of a filter system constructed and operative in accordance with yet another embodiment of the present invention.
Figure 7A:
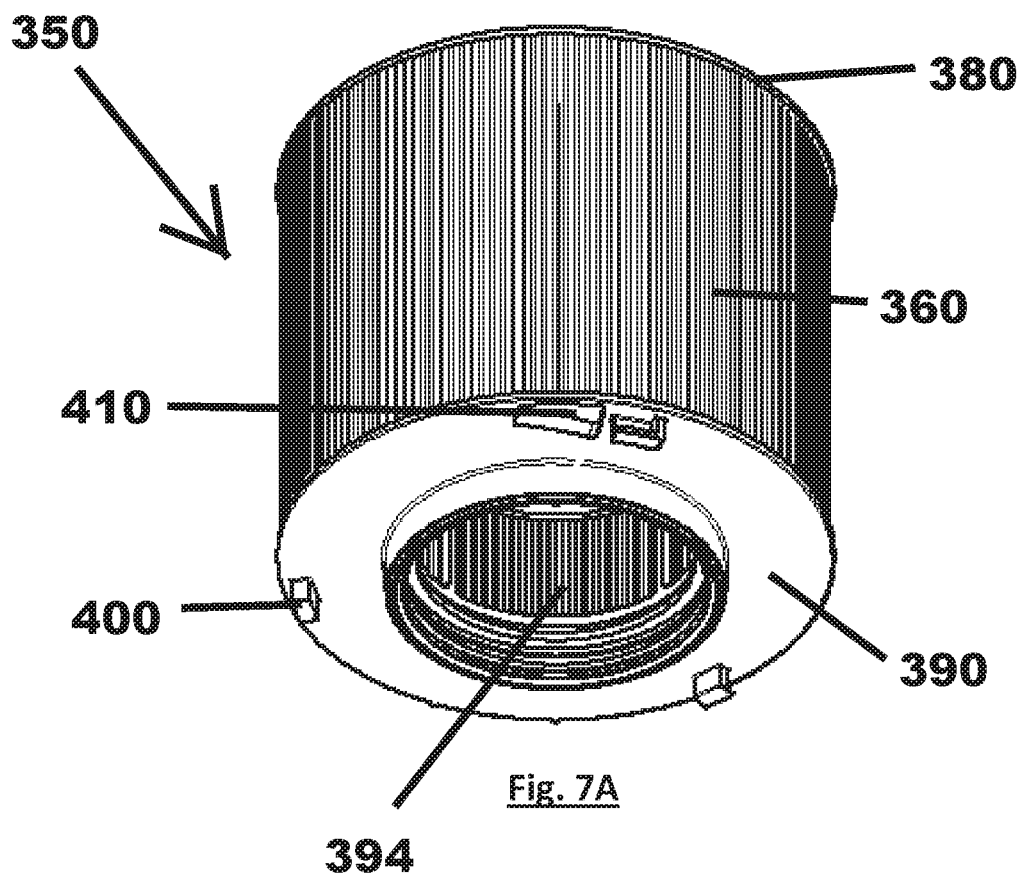
FIGS. 7A, 7B and 7C are simplified respective pictorial, planar side view and planar bottom view illustrations of a filter element forming part of the filter system of FIG. 6.
Figure 7B:
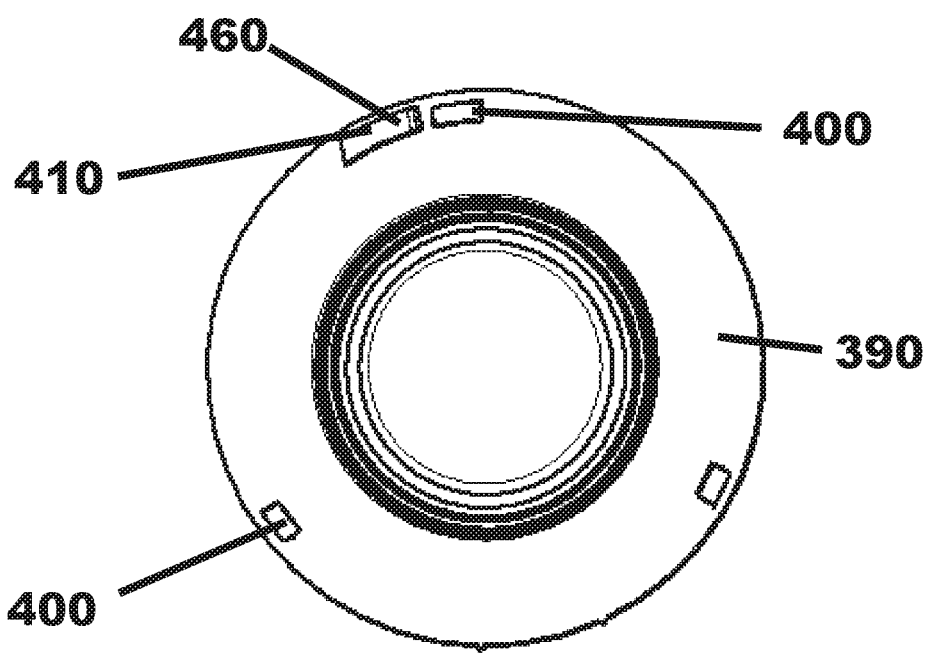
Figure 7C:
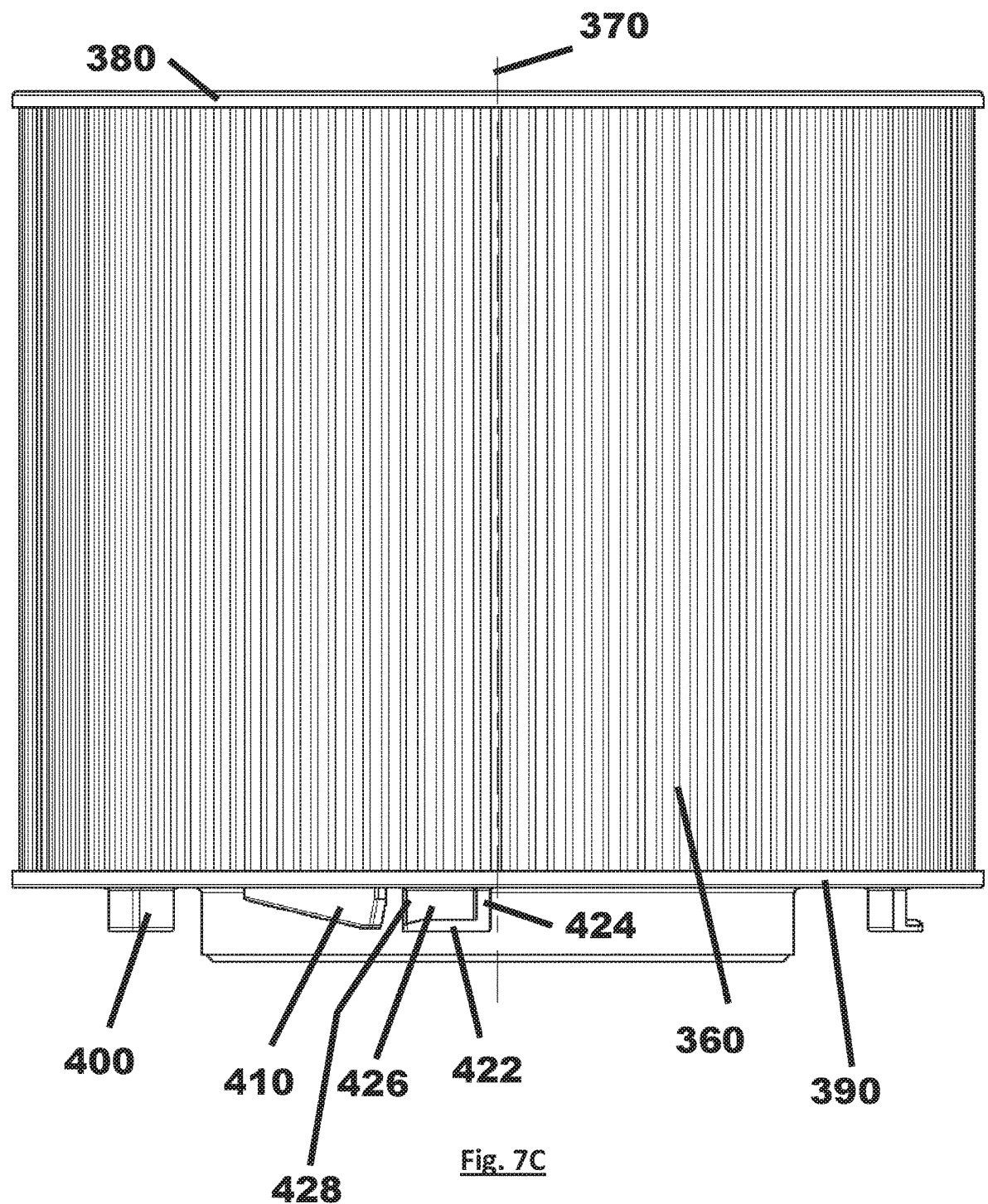
Figure 8:
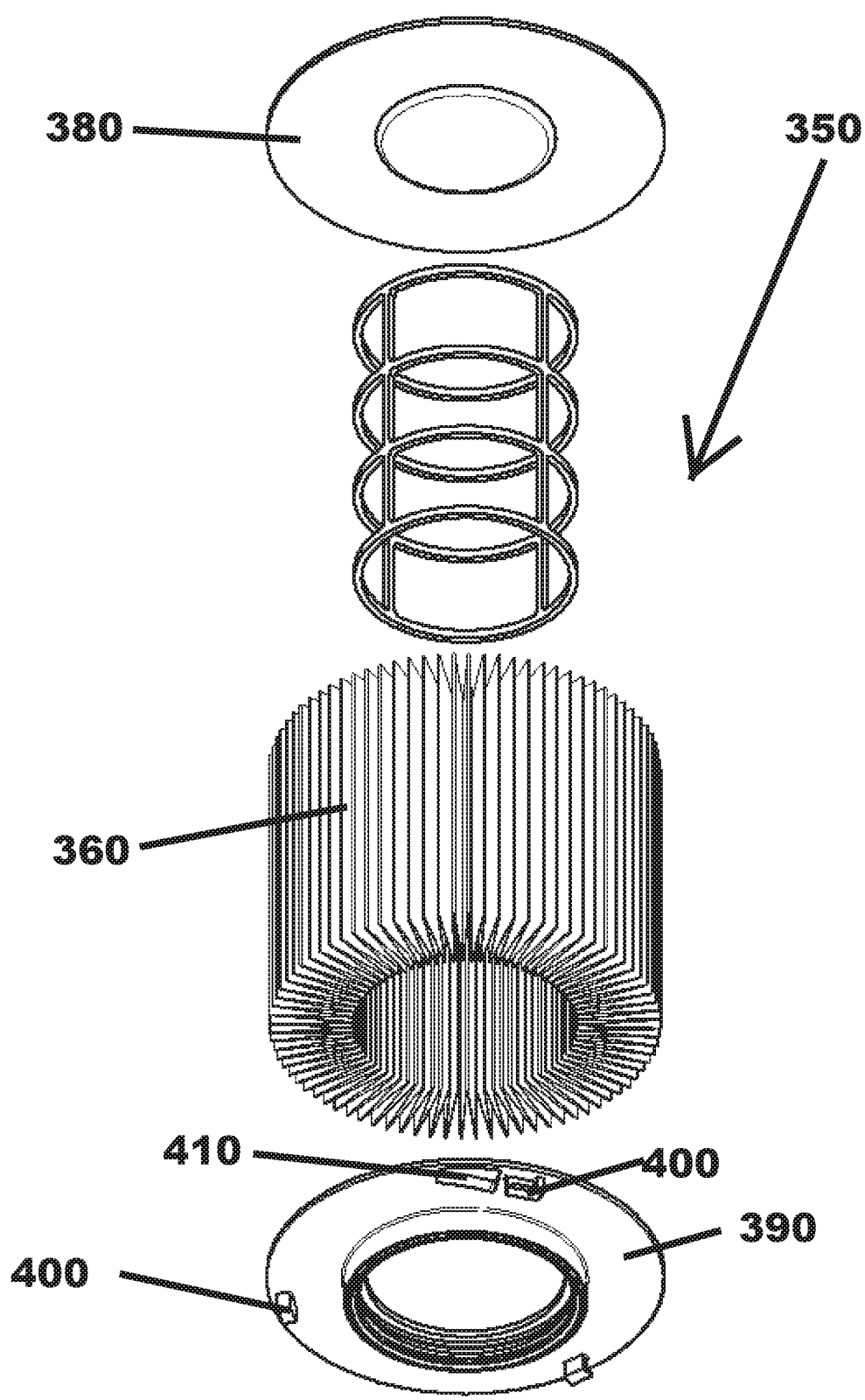
FIG. 8 is a simplified exploded view illustration of the filter element of FIGS. 7A-7C.

As see in FIG. 6, filter element engagement protrusions 320 preferably each include a top wall portion 322, extending generally perpendicular to longitudinal axis 318, and an end wall portion 324 joining top wall portion 322 and defining therewith a channel 326 having an open end 328, typically facing in a counter-clockwise direction, indicated by an arrow 330, in the downward-facing sense of FIG. 6, and an open radially inward facing side opening 332.

In accordance with a preferred embodiment of the present invention, as illustrated in FIGS. 6-9F, filter system 300 comprises a filter element 350 which includes a filter medium 360, arranged in a cylindrical arrangement about a longitudinal axis 370, which when filter element 350 is mounted onto filter support 310, is coaxial with longitudinal axis 318. First and second end caps 380 and 390 are arranged at opposite cylindrical ends of the filter medium 360 and sealed thereto.

Fluid, such as air, to be filtered enters the filter element 350 via the filter medium 360 and is filtered thereby and the filtered fluid leaves the filter element 350 via a filtered fluid outlet 394 formed in second end cap 390.

It is a particular feature of a preferred embodiment of the present invention that at least one locking protrusion 400 is located on second end cap 390 for rotatably locking the fluid filter element 350 to filter support 300 by engagement of locking protrusions 400 with corresponding filter element engagement protrusions 320 of filter support 310 by means of rotation of the fluid filter element 350 about mutually coaxial longitudinal axes 318 and 370 in a first direction of rotation, here shown as counterclockwise, in the sense of FIG. 6, and indicated by an arrow 402.

It is a further particular feature of a preferred embodiment of the present invention that at least one releasable retainer 410 is located on second end cap 390 and associated with one or more locking protrusion 400 for retaining locking protrusion 400 in locking engagement with filter support 310. Releasable retainer 410, only one of which is shown in FIGS. 6-9F, is operative, when released, to allow rotatable unlocking of filter element 350 from filter support 310 by rotation of the filter element about coaxial longitudinal axes 318 and 370 is in a second direction of rotation, opposite to the first direction. The second direction of rotation is indicated by an arrow 414.

In the embodiment of FIGS. 6-9F, the locking protrusion 400 preferably extends downwardly from second end cap 390. Protrusion 400 preferably includes a bottom wall portion 422, extending generally perpendicular to longitudinal axis 370, and an end wall portion 424 joining bottom wall portion 422 and defining therewith a channel 426 having an open end 428, typically facing in a clockwise direction, in the sense of FIG. 6, indicated by arrow 402, and an open radially outward facing side opening 432.

Figure 9A:
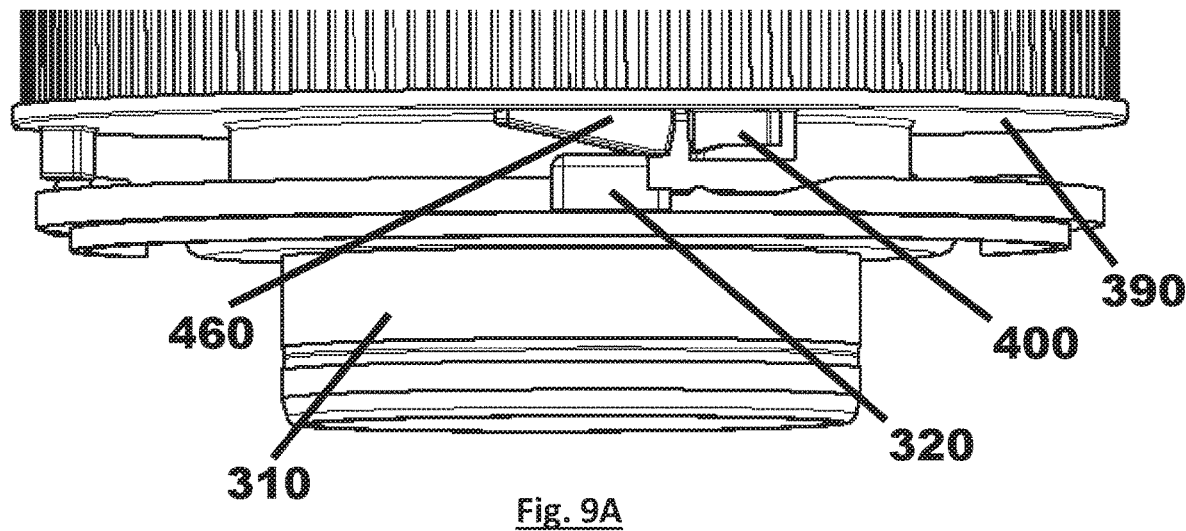
FIGS. 9A, 9B, 9C, 9D, 9E and 9F are simplified illustrations of locking and unlocking engagement of the filter element of FIGS. 7A-8 with the filter support of FIG. 6.
Figure 9B:
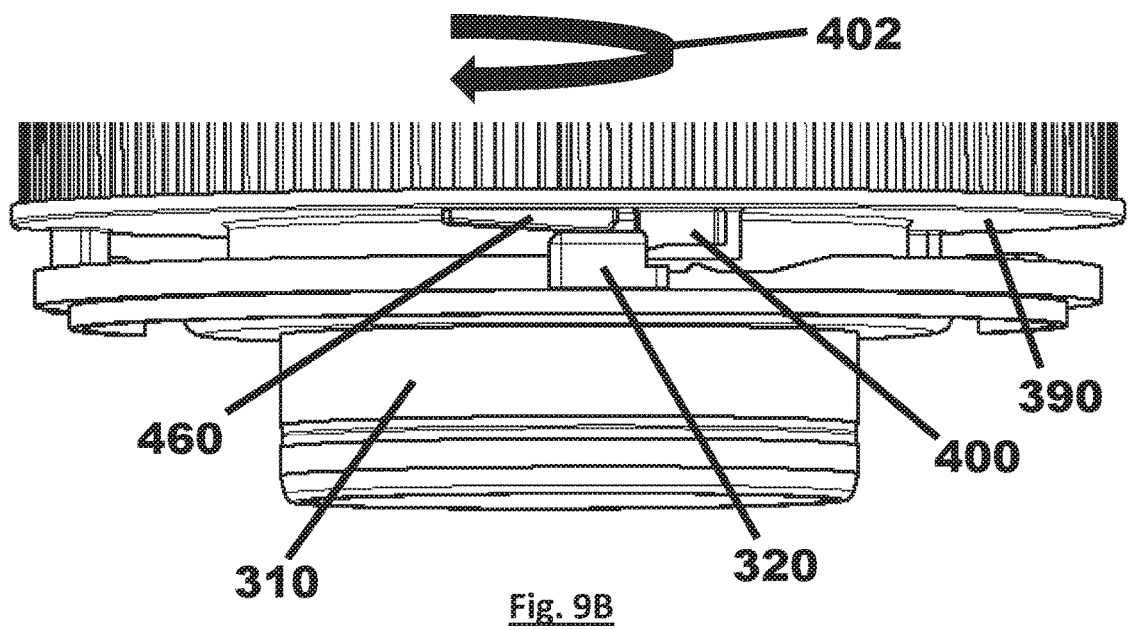
Figure 9C:
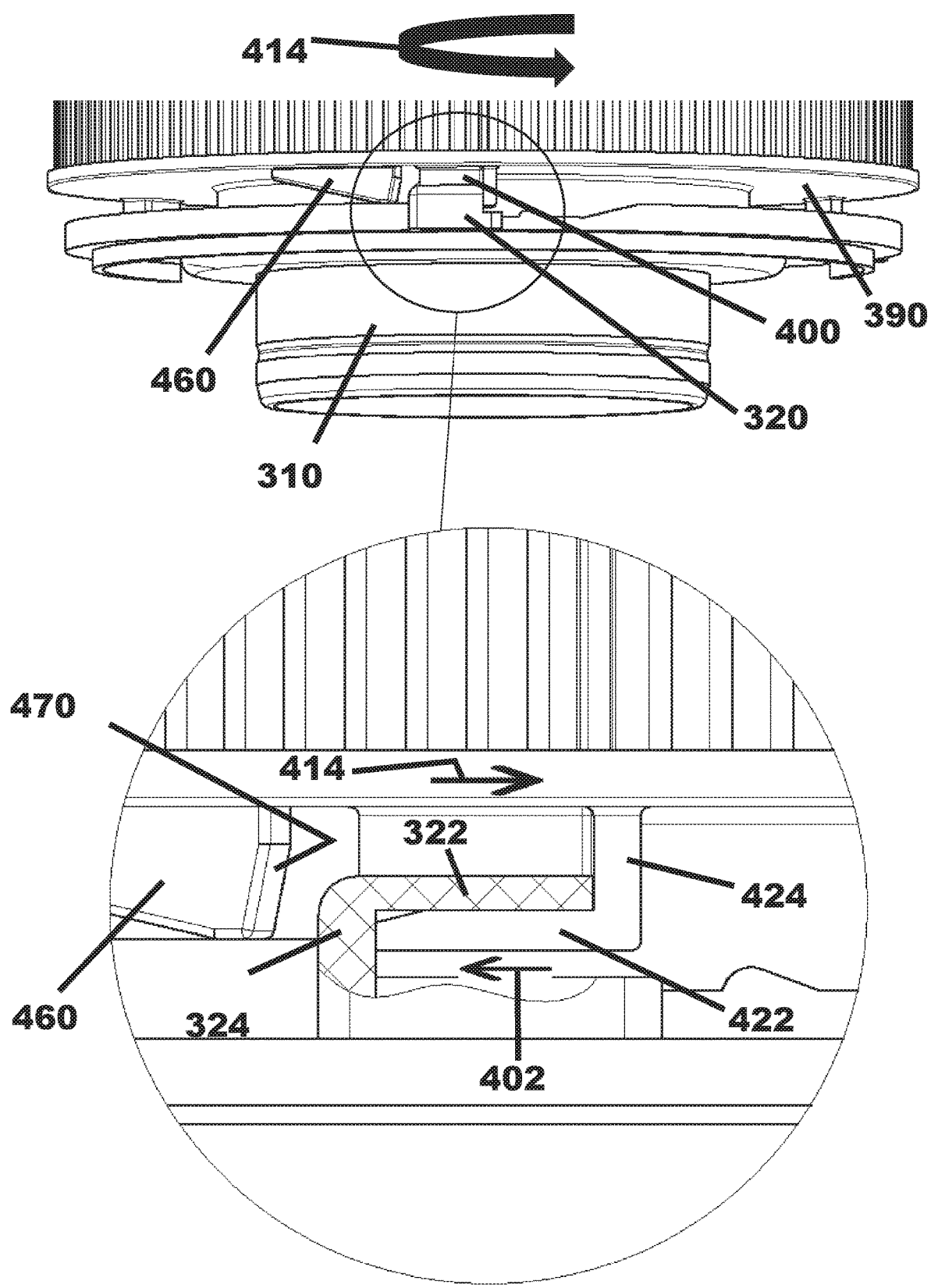

Protrusion 400 is configured for rotatable engagement and disengagement with a corresponding protrusion 320 of filter support 310, whereby rotatable engagement is produced by rotation of filter element 350 from an operative orientation shown in FIG. 9A, about coaxial axes 318 and 370 such that bottom wall portion 422 slidingly moves rotationally through open side opening 332 of protrusion 320, as seen in FIG. 9B, in a direction indicated by arrow 402, until end wall portion 424 of protrusion 400 abuts against top wall portion 322 of protrusion 320 and bottom wall portion 422 of protrusion 400 abuts against end wall portion 324 of protrusion 320, as seen in FIG. 9C.

At least partially integrally formed with second end cap 390 is at least one releasable retainer 410 associated with at least one locking protrusion 400 for retaining the at least one locking protrusion 400 in locking engagement with a corresponding engagement protrusion 320 of the filter support 310. In the illustrated embodiment a single releasable retainer 410 is provided. Releasable retainer 410 is operative when the filter element is in its operative orientation vis a vis the filter support 310 shown in FIG. 9C to prevent rotation of the filter element 350 relative to the filter support 310 about coaxial longitudinal axes 318 and 370 in a direction indicated by arrow 414 in FIG. 9C. When retainer 410 is displaced, typically by manual action, it is operative to allow rotatable unlocking of the fluid filter element 350 from the filter support 310 by rotation of the fluid filter element 350 in the direction indicated by arrow 414.

In the embodiment of FIGS. 6-9F, the releasable retainer 410 comprises a resilient compressible, generally triangular securing finger 460 which is preferably co-molded with second end cap 390 and which is normally in a raised operative orientation, as seen in FIGS. 6-8 and 9A. As seen particularly in FIG. 7B, compressible securing finger 460 has a width that is preferably greater than the width of protrusion 400 and is thus manually engageable. As seen in FIG. 9B, initial rotational engagement between protrusions 320 and 400 causes compressible securing finger 460 to be compressed as protrusion 320 passes thereover into full rotational engagement with protrusion 400. Upon full rotational engagement with protrusion 400, protrusion 320 clears compressible resilient securing finger 460 and allows it to reassume its raised operative orientation, as seen in FIG. 9C.

It is appreciated that when resilient compressible securing finger 460 is in its raised operative orientation and protrusions 320 and 400 are in full rotational engagement, as seen in FIG. 9C, a forward edge 470 of resilient securing finger 460 engages a corresponding facing edge of protrusion 320 and prevents rotational movement of protrusion 400 relative to protrusion 320 in a direction indicated by arrow 414, and thus prevents mutual disengagement of protrusions 320 and 400, thereby preventing disengagement of filter element 350 from filter support 310.

Figure 9D:
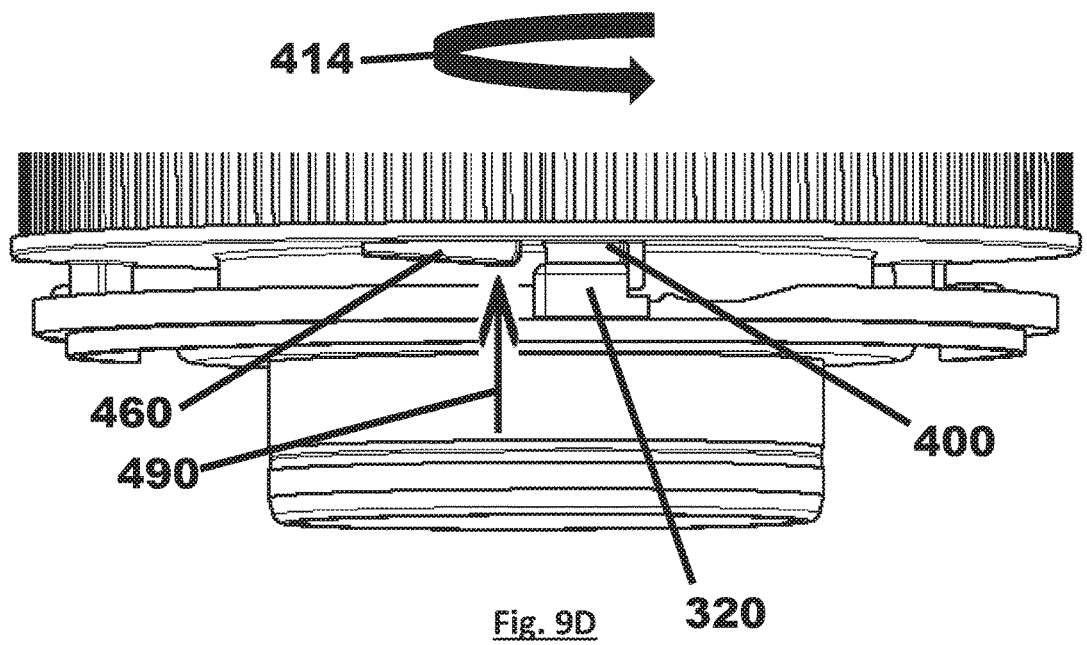
Figure 9E:
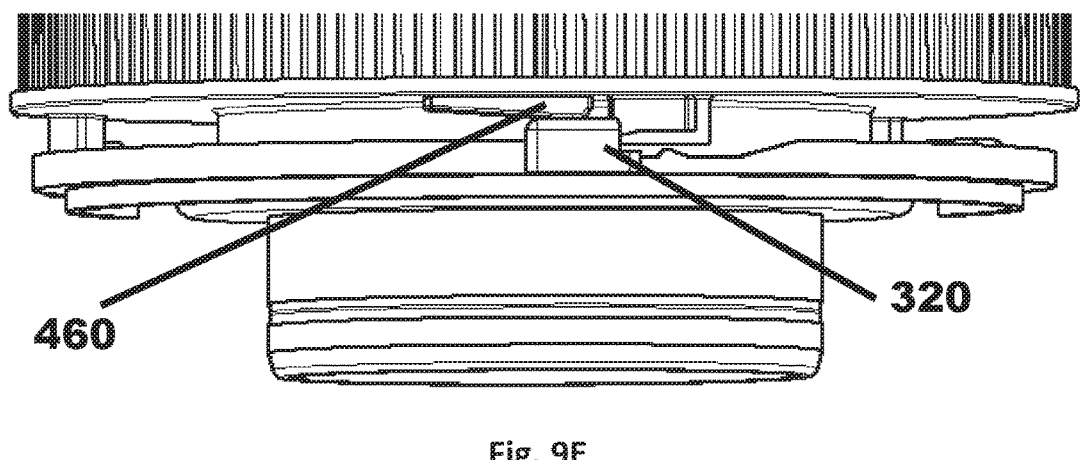
Figure 9F:
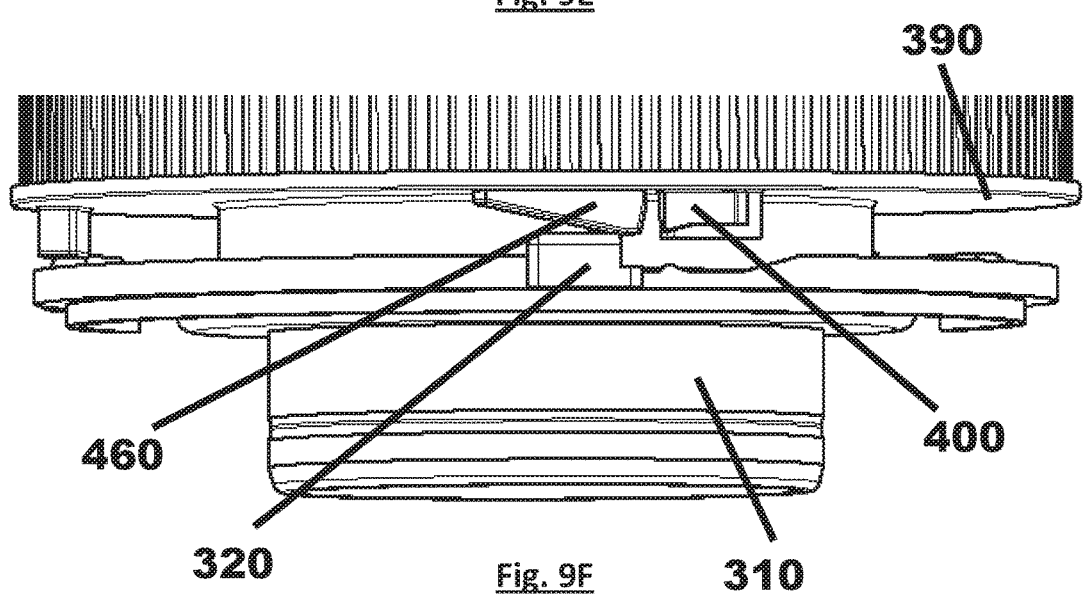

Turning to FIG. 9D, it is seen that compressing resilient securing finger 460, as by manual engagement therewith, in a direction indicated by an arrow 490, enables protrusion 320 to clear forward edge 470 of finger 460 and thus enables the filter element 350 to be rotated in direction 414 and over finger 460, as seen in FIG. 9E and onward to a fully disengaged mutual orientation as seen in FIG. 9F.

Rotatable disengagement is produced by rotation of filter element 350 about coaxial axes 318 and 370 such that bottom wall portion 322 slidingly moves rotationally through open side opening 332 of protrusion 320 away from end wall portion 324 of protrusion 320 until protrusions 400 and 320 are no longer in engagement.

Figure 10:
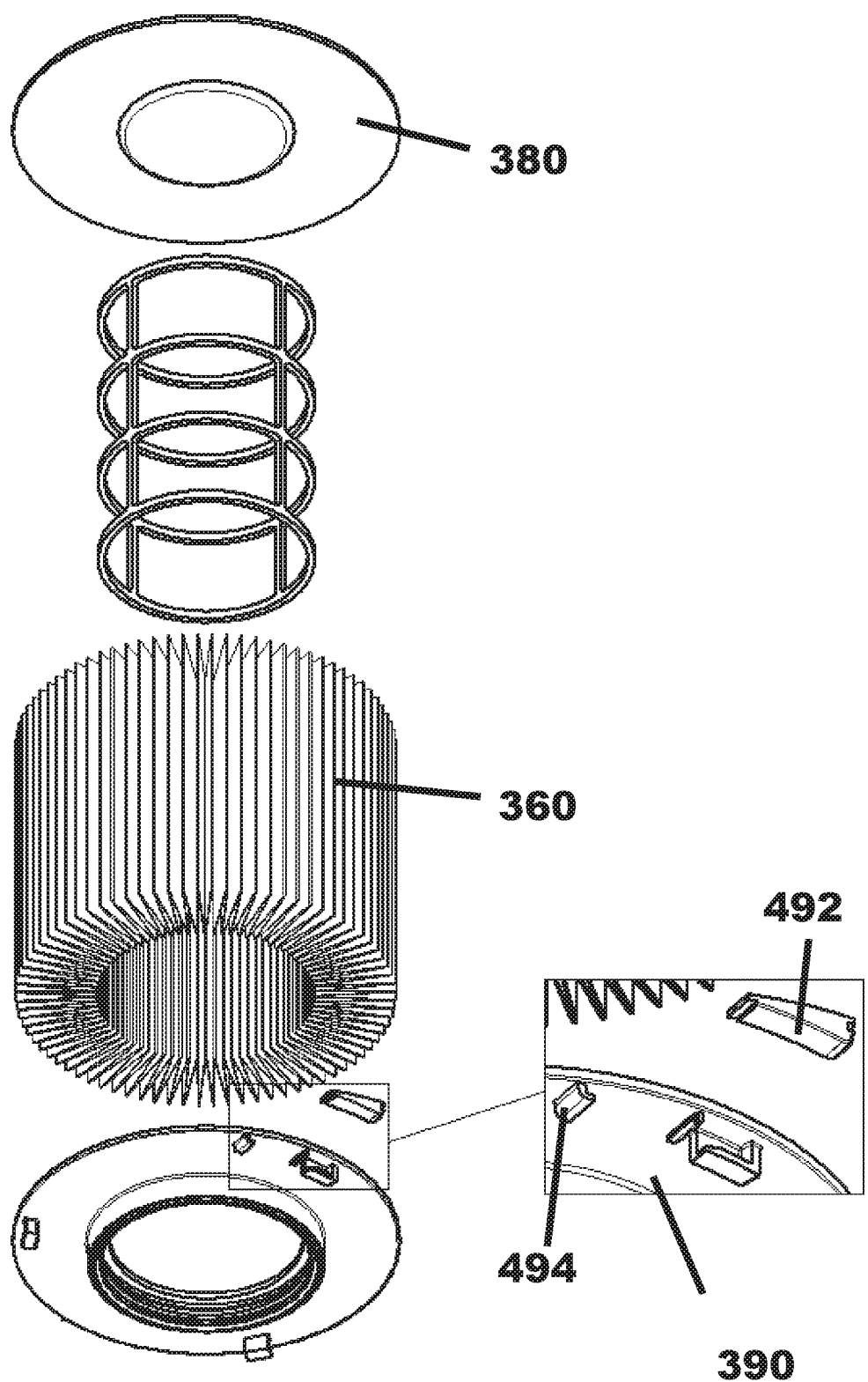
FIG. 10 is a simplified exploded view illustration of an alternative embodiment of the filter element of FIGS. 7A-7C.

Referring now to FIG. 10, it is seen that in an alternative embodiment of the present invention, a compressible resilient securing finger 492 may be mounted onto a mounting socket 494 formed on second end cap 390, rather than being integrally formed therewith. The functionality of resilient securing finger 492 may be identical to that of compressible resilient securing finger 460. Alternatively, the socket 494 may be obviated and the finger 492 may be mounted directly onto the second end cap 390.

It will be appreciated by persons skilled in the art that the present invention is not limited to what has been particularly shown and described hereinabove. Rather it includes combinations and subcombinations of features described hereinabove as well as modifications thereof which are not in the prior art.

The invention claimed is:

1. A fluid filter element for circular securable locking engagement with a filter support, said fluid filter element comprising:
 a filter medium arranged in a cylindrical arrangement about a longitudinal axis;
 first and second end caps arranged at opposite cylindrical ends of said filter medium and sealed thereto, said second end cap defining a filtered fluid outlet;
 at least one locking protrusion located on said second end cap for rotatably locking said fluid filter to said filter support by rotation of said fluid filter element about said longitudinal axis in a first direction of rotation relative to said filter support; and at least one circumferentially directed releasable retainer located on said second end cap and associated with said at least one locking protrusion for retaining said at least one locking protrusion in locking engagement with said filter support and being operative, when released, to allow rotatable unlocking of said fluid filter element from said filter support by rotation of said fluid filter element about said longitudinal axis in a second direction of rotation relative to said filter support, opposite to said first direction of rotation, said at least one circumferentially directed releasable retainer exerting a circumferentially directed retaining force on said filter support.

2. A fluid filter element according to claim 1 and wherein said at least one releasable retainer is configured for actuation in a direction generally parallel to said longitudinal axis to provide release, thereby to allow rotatable unlocking of said fluid filter element from said filter support.

3. A fluid filter element according to claim 1 and wherein said at least one locking protrusion is entirely integrally formed with said second end cap.

4. A fluid filter element according to claim 2 and wherein said at least one releasable retainer is entirely integrally formed with said second end cap.

* * * * *